United States Patent
Chen et al.

(10) Patent No.: US 9,769,066 B2
(45) Date of Patent: Sep. 19, 2017

(54) ESTABLISHING AND PROTECTING LABEL SWITCHED PATHS ACROSS TOPOLOGY-TRANSPARENT ZONES

(71) Applicant: Futurewei Technologies, Inc., Plano, TX (US)

(72) Inventors: Huaimo Chen, Bolton, MA (US); Renwei Li, Fremont, CA (US)

(73) Assignee: Futurewei Technologies, Inc., Plano, TX (US)

( * ) Notice: Subject to any disclaimer, the term of this patent is extended or adjusted under 35 U.S.C. 154(b) by 191 days.

(21) Appl. No.: 14/333,024

(22) Filed: Jul. 16, 2014

(65) Prior Publication Data

US 2015/0023150 A1 Jan. 22, 2015

Related U.S. Application Data

(60) Provisional application No. 61/846,721, filed on Jul. 16, 2013.

(51) Int. Cl.
*H04L 12/723* (2013.01)
*H04L 12/707* (2013.01)
*H04L 12/703* (2013.01)
*H04L 12/24* (2006.01)

(52) U.S. Cl.
CPC .......... *H04L 45/50* (2013.01); *H04L 41/0668* (2013.01); *H04L 41/0677* (2013.01); *H04L 45/22* (2013.01); *H04L 45/28* (2013.01); *H04L 41/12* (2013.01)

(58) Field of Classification Search
None
See application file for complete search history.

(56) References Cited

U.S. PATENT DOCUMENTS

| | | | | |
|---|---|---|---|---|
| 2006/0198695 A1* | 9/2006 | Kano | ...................... | H04L 45/02 403/408.1 |
| 2007/0133406 A1* | 6/2007 | Vasseur | ................... | H04L 45/02 370/230 |
| 2011/0182185 A1* | 7/2011 | Vigoureux | .............. | H04L 45/50 370/241.1 |

OTHER PUBLICATIONS

Chen et al, Applicability of OSPF Topology-Transparent Zone draft-chen-ospf-ttz--00.txt., Jul. 2012.*
Chen, H., et al., U.S. Appl. No. 61/846,721; Entitled, "Establishment and Protection of LSP Crossing TTZ," filed Jul. 16, 2013.
Chen, H., et al., U.S. Appl. No. 14/203,177; Entitled, "Discovering a Topology-Transparent Zone," filed Mar. 10, 2014; Specification 21 pages; Drawing Sheets (Figures 1-7).
(Continued)

*Primary Examiner* — Vinncelas Louis
(74) *Attorney, Agent, or Firm* — Conley Rose, P.C.

(57) ABSTRACT

A label switched path (LSP) establishing method that includes receiving a first path message from a network node outside of a topology-transparent zone (TTZ) along a path for the LSP, computing a TTZ path through the TTZ from the network component to an egress TTZ edge node along the LSP, sending a second path message to a TTZ internal node along the TTZ path, receiving a first reservation (RESV) message from the TTZ internal node that includes a label allocated for the egress TTZ edge node, and sending a second RESV message that includes a label allocated for the network component and the label allocated for the egress TTZ edge node to the network node.

19 Claims, 9 Drawing Sheets

(56) References Cited

OTHER PUBLICATIONS

Chen, H., et al., U.S. Appl. No. 14/188,080; Entitled, "Constructing a Topology-Transparent Zone," filed Feb. 24, 2014; Specification 20 pages; Drawing Sheets (Figures 1-8).
Chen, H., et al., "TE LSP Crossing Topology-Transparent Zones," draft-chen-ospf-te-ttz-00.txt, Jun. 3, 2014, 13 pages.
Berger, L., et al., "Resource Reservation Protocol (RSVP) Message Formats for Label Switched Path (LSP) Attributes Objects," RFC 6510, Feb. 2012, 8 pages.
Bradner, S., et al., "Key Words for Use in RFCs to Indicate Requirement Levels," RFC 2119, Mar. 1997, 3 pages.
Vasseur, JP. Ed., et al., "A Backward-Recursive PCE-Based Computation (BRPC) Procedure to Compute Shortest Constrained Inter-Domain Traffic Engineering Label Switched Paths," RFC 5441, Apr. 2009, 18 pages.
Coltun, R., et al., "OSPF for IPv6," RFC 2740, Dec. 1999, 80 pages.
Lindem, A., Ed., "Extensions to OSPF for Advertising Optional Router Capabilities," RFC 4970, Jul. 2007, 13 pages.
Vasseur, JP., Ed., et al., "Path Computation Element (PCE) Communication Protocol (PCEP)," RFC 5440, Mar. 2009, 87 pages.
Moy, J., et al., "OSPF Version 2," RFC 2328, Apr. 1998, 244 pages.
Coltun, R., "The OSPF Opaque LSA Option," RFC 2370, Jul. 1998, 15 pages.
Katz, et al., "Traffic Engineering (TE) Extensions to OSPF Version 2," RFC 3630, Sep. 2003, 14 pages.

* cited by examiner

ESTABLISHING AND PROTECTING LABEL SWITCHED PATHS ACROSS TOPOLOGY-TRANSPARENT ZONES

CROSS-REFERENCE TO RELATED APPLICATIONS

The present application claims priority to U.S. Provisional Application No. 61/846,721 filed Jul. 16, 2013 by Huaimo Chen, and entitled "Establishment and Protection of LSP Crossing TTZ," which is incorporated herein by reference as if reproduced in its entirety.

STATEMENT REGARDING FEDERALLY SPONSORED RESEARCH OR DEVELOPMENT

Not applicable.

REFERENCE TO A MICROFICHE APPENDIX

Not applicable.

BACKGROUND

As Internet traffic continues to grow, the number of network nodes may also increase within a network. To manage the Internet traffic, the network may be extended by splitting the network into a plurality of areas. However, splitting the network may be challenging or may cause availability issues, operation issues, and/or performance issues. For instance, dividing a network from one area into multiple areas or from a number of existing areas to more areas may be time consuming and also involve significant network architecture changes. Services carried by a network may also be interrupted while the network is being split into multiple areas. Further, setting up a multi-protocol label switching (MPLS) traffic engineering (TE) label switching path (LSP) that crosses multiple areas may be complex. In a conventional system, a TE path crossing multiple areas may be computed by using a path computation element (PCE) through the PCE Communication Protocol (PCEP). Such a conventional system may require manual configuration of the sequenced domains and may be difficult to configure by a network operator. Additionally, the conventional system may not guarantee an optimal path.

SUMMARY

In one embodiment, the disclosure includes an LSP establishing method comprising receiving a first path message from a network node outside of a topology-transparent zone (TTZ) along a path for the LSP, computing a TTZ path through the TTZ from the network component to an egress TTZ edge node along the LSP, sending a second path message to a TTZ internal node along the TTZ path, receiving a first reservation (RESV) message from the TTZ internal node that comprises a label allocated for the egress TTZ edge node, and sending a second RESV message that comprises a label allocated for the network component and the label allocated for the egress TTZ edge node to the network node, wherein the LSP crosses a plurality of networks and the TTZ.

In another embodiment, the disclosure includes an LSP establishing method comprising receiving a first path message that comprises routing information for a path for an LSP from a TTZ node within a TTZ along the path, recording a virtual link to an ingress TTZ edge node along the path for the LSP in a second path message using the routing information, sending the second path message to a network node outside of the TTZ along the path for the LSP, receiving a first RESV message from the network node outside of the TTZ that comprises a routing label allocated by a network node outside of the TTZ, and sending a second RESV message to the TTZ node that comprises a routing label allocated for the network node, wherein the path for the LSP crosses a plurality of networks and a TTZ.

In yet another embodiment, the disclosure includes an LSP protection method comprising sending a first path message along a first path from a first network to a second network via a TTZ, receiving a first plurality of routing labels in response to sending the first path message, sending a second plurality of routing labels to a network node, wherein sending the second plurality routing labels establishes a first LSP, sending a second path message along a second path from the first network to an egress edge node of the TTZ, receiving a third plurality of routing labels in response to sending the second path message, wherein receiving the third plurality of routing labels establishes a second LSP, sending data traffic along the first LSP, detect a fault is present along the first LSP, and rerouting data traffic along the second LSP when the fault along the first LSP is present.

These and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

It should be understood at the outset that although an illustrative implementation of one or more embodiments are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

Disclosed herein are various embodiments for establishing and protecting one or more LSPs that cross one or more TTZs. An MPLS TE LSP may be established across multiple network domains and/or autonomous systems (AS) and one or more TTZs. The internal topology of a TTZ may be summarized to network nodes outside of the TTZ as a set of interconnected TTZ edge nodes. The TTZ nodes within a TTZ may be aware of TE and/or topology information for networks outside of the TTZ. As such, an LSP that crosses a TTZ may be configured to provide end to end service across the TTZ, such that, network nodes outside of the TTZ may interact with the TTZ, but are unaware of the internal topology or the construction of the TTZ. LSPs may be computed without relying on intermediaries (e.g., a PCE). A backup LSP may be established for an LSP and configured to protect the LSP in the event of a network node and/or network link failure along the LSP. When a fault occurs along the first LSP, the backup LSP may be configured to send data traffic along a backup LSP and around a fault and then merge the data traffic into the LSP.

Figure 1:
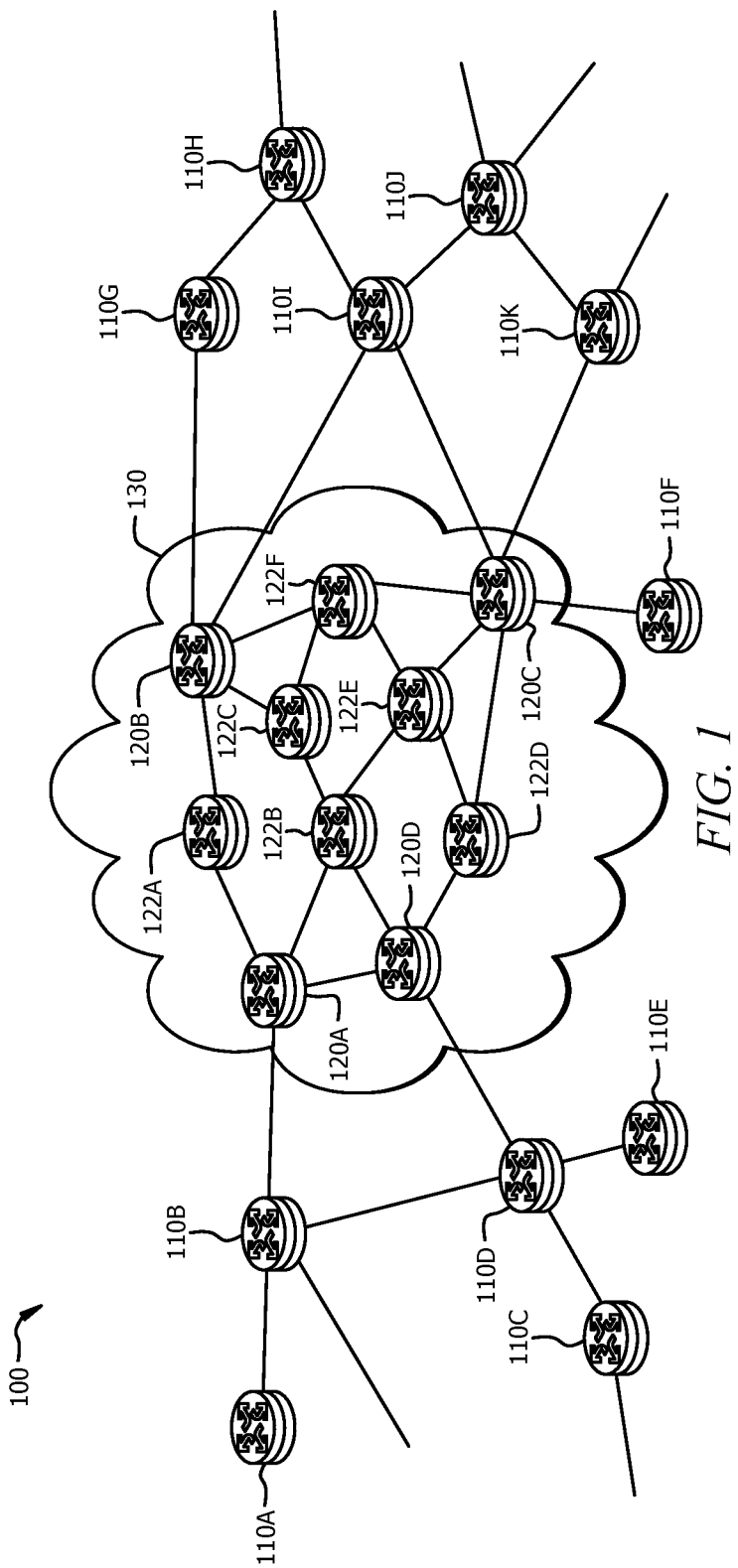
FIG. 1 is a schematic diagram of an embodiment of a label switched system.

FIG. 1 is a schematic diagram of an embodiment of a label switched system 100 where embodiments of the present disclosure may operate. The label switched system 100 comprises a plurality of network nodes 110A-110K and a TTZ 130 which comprises a plurality of TTZ edge nodes 120A-120D and a plurality of TTZ internal nodes 122A-122F. TTZ 130 may be configured such that a plurality of nodes (e.g., TTZ internal nodes 122A-122F) and/or links within TTZ 130 and/or routing information within TTZ 130 is unknown to network nodes (e.g., network nodes 110A-110K) outside of TTZ 130, when TTZ 130 is virtualized, as described in FIG. 2. In one embodiment, a TTZ 130 may be a zone within an open shortest path first (OSPF) network or area in the label switched system 100. A network operator or centralized controller (e.g., a software-defined network (SDN) controller) may set up the TTZ edge nodes 120A-120D and/or the TTZ internal nodes 122A-122F. A TTZ edge node 120A-120D may be a network node that is coupled to one or more network nodes 110A-110K located outside TTZ 130, one or more TTZ internal nodes 122A-122F, and/or one or more other TTZ edge nodes 120A-120D. A TTZ internal node 122A-122F may be a network node that is coupled to one or more other TTZ internal nodes 122A-122F, and/or one or more TTZ edge nodes 120A-120D. A TTZ internal node 122A-122F may not be directly coupled to a network node outside of the TTZ 130, for example, network nodes 110A-110K. The TTZ edge nodes 120A-120D and the TTZ internal nodes 122A-122F may be configured to use a common TTZ identifier (ID), which may be a label that identifies TTZ 130.

The network nodes 110A-110K, the TTZ edge nodes 120A-120D, and the TTZ internal nodes 122A-122F may be coupled to one another via one or more links. The links discussed herein may be physical links, such as electrical and/or optical links, and/or logical links (e.g., virtual links) used to transport data. A link between two network nodes within the TTZ 130 (e.g., the TTZ edge nodes 120A-120D and/or the TTZ internal nodes 122A-122F) may be referred to as a TTZ link. As such, a link between a network node within the TTZ 130 (e.g., the TTZ edge nodes 120A-120D) and a network node outside of the TTZ 130 (e.g., network nodes 110A-110K) may be referred to as a non-TTZ link.

In one embodiment, the TTZ edge nodes 120A-120D may be set up by configuring a TTZ ID on each of the links between each of the TTZ edge nodes 120A-120D and other TTZ edge nodes 120A-120D and/or TTZ internal nodes 122A-122F. The TTZ internal nodes 122A-122F may be set up by configuring the TTZ ID on each of the TTZ internal nodes 122A-122F. Configuring the TTZ ID on each of the TTZ internal nodes 122A-122F may indicate that the TTZ internal nodes 122A-122F are TTZ internal nodes and the links associated with each of the TTZ internal nodes 122A-122F are TTZ links.

The network nodes 110A-110K, the TTZ edge nodes 120A-120D, and the TTZ internal nodes 122A-122F may be any devices or components that support the transportation of data traffic (e.g., data packets) through the label switched system 100. For example, the network nodes 110A-110K, the TTZ edge nodes 120A-120D, and the TTZ internal nodes 122A-122F may be switches, routers, any other suitable network device for communicating packets as would be appreciated by one of ordinary skill in the art upon viewing this disclosure, or combinations thereof. The network nodes 110A-110K, the TTZ edge nodes 120A-120D, and the TTZ internal nodes 122A-122F may be configured to receive data from other network nodes, to determine which network nodes to send the data to (e.g., via logic circuitry or a forwarding table), and/or to transmit the data to other network nodes.

In an embodiment, the TTZ edge nodes 120A-120D and the TTZ internal nodes 122A-122F may be configured to generate a router information (RI) LSA comprising a TTZ type-length-value (TLV). For example, a TTZ edge node (e.g., TTZ edge node 120A) may generate an RI LSA comprising a TTZ TLV indicating the TTZ edge node is a TTZ edge node and a TTZ ID for the TTZ 130. The TTZ ID may be a numeric value, such as 100, that identifies TTZ 130. A TTZ internal node (e.g., TTZ internal node 122A) may generate an RI LSA comprising a TTZ TLV that indicates the TTZ internal node is a TTZ internal node and a TTZ ID (e.g., 100) for TTZ 130. The TTZ edge nodes 120A-120D and the TTZ internal nodes 122A-122F may be configured to flood the RI LSA to other TTZ edge nodes (e.g., TTZ edge nodes 120A-120D) and/or to other TTZ internal nodes (e.g., TTZ internal nodes 122A-122F). For example, the TTZ edge nodes 120A-120D and the TTZ internal nodes 122A-122F may send the RI LSAs via the TTZ links. The TTZ edge nodes 120A-120D may not send the RI LSAs via non-TTZ links.

The TTZ edge nodes 120A-120D and the TTZ internal nodes 122A-122F may also be configured to receive a plurality of RI LSAs comprising a TTZ TLV from other TTZ edge nodes 120A-120D and/or other TTZ internal nodes 122A-122F. After receiving the RI LSAs, the TTZ edge nodes 120A-120D and the TTZ internal nodes 122A-122F may be configured to store information pertaining to the RI LSAs. For example, after receiving an RI LSA comprising a TTZ TLV with a TTZ ID, the RI LSA information may be stored into a link-state database (LSDB). The RI LSA information stored within the LSDB may include, but are not limited to, the advertising node, the node type (e.g., TTZ edge node or TTZ internal node), and the TTZ ID. Once receiving and/or storing the RI LSA information, the TTZ edge nodes 120A-120D and the TTZ internal nodes 122A-122F may flood the RI LSA to other TTZ edge nodes 120A-120D and/or other TTZ internal nodes 122A-122F over the TTZ links.

The topology of a TTZ, such as TTZ 130, may be determined by receiving and storing RI LSAs and conventional LSAs. For example, the topology of the TTZ may be represented by all the conventional LSAs stored in the TTZ edge nodes 120A-120D and/or the TTZ internal nodes 122A-122F. In such an example, each of the conventional LSAs may comprise the same advertising network node as one of the RI LSAs stored in the TTZ edge nodes 120A-120D and/or the TTZ internal nodes 122A-122F.

The TTZ edge nodes 120A-120D may also be configured to compute routes using the topology of the TTZ 130. The topology of the TTZ 130 may comprise the TTZ edge nodes 120A-120D and the TTZ internal nodes 122A-122F having the TTZ ID associated with the TTZ 130. For example, a TTZ edge node may be configured to compute the shortest path to other TTZ edge nodes using the topology of the TTZ 130 and the RI LSAs with the TTZ ID for the TTZ 130. The cost of the shortest path may be used as the cost of a virtual link between two TTZ edge nodes.

The TTZ edge nodes 120A-120D may also be configured to generate an LSA for virtualizing the TTZ 130 comprising a plurality of virtual links and a plurality of non-TTZ links. The TTZ edge nodes 120A-120D may be configured to distribute the LSA for virtualizing the TTZ 130 via the TTZ links and the non-TTZ links. In response to receiving an LSA for virtualizing the TTZ 130, the TTZ edge nodes 120A-120D and the TTZ internal nodes 122A-122F may be configured to store the LSA for virtualizing the TTZ 130, such as within a LSDB. In an example embodiment, the LSA for virtualizing the TTZ 130 may be stored in a different LSDB than the RI LSAs. Additionally, the TTZ edge nodes 120A-120D and the TTZ internal nodes 122A-122F may be configured to flood the LSA for virtualizing the TTZ 130 to network nodes 110A-110K, other TTZ edge nodes 120A-120D, and/or other TTZ internal nodes 122A-122F using the TTZ links and the non-TTZ links. Additional information for a TTZ 130 may be as described in U.S. patent application Ser. No. 14/188,080, titled "Constructing a Topology-Transparent Zone" and in U.S. patent application Ser. No. 14/203,177, titled "Discovering a Topology-Transparent Zone," by Huaimo Chen, both of which are hereby incorporated by reference as if reproduced in their entirety.

Figure 2:
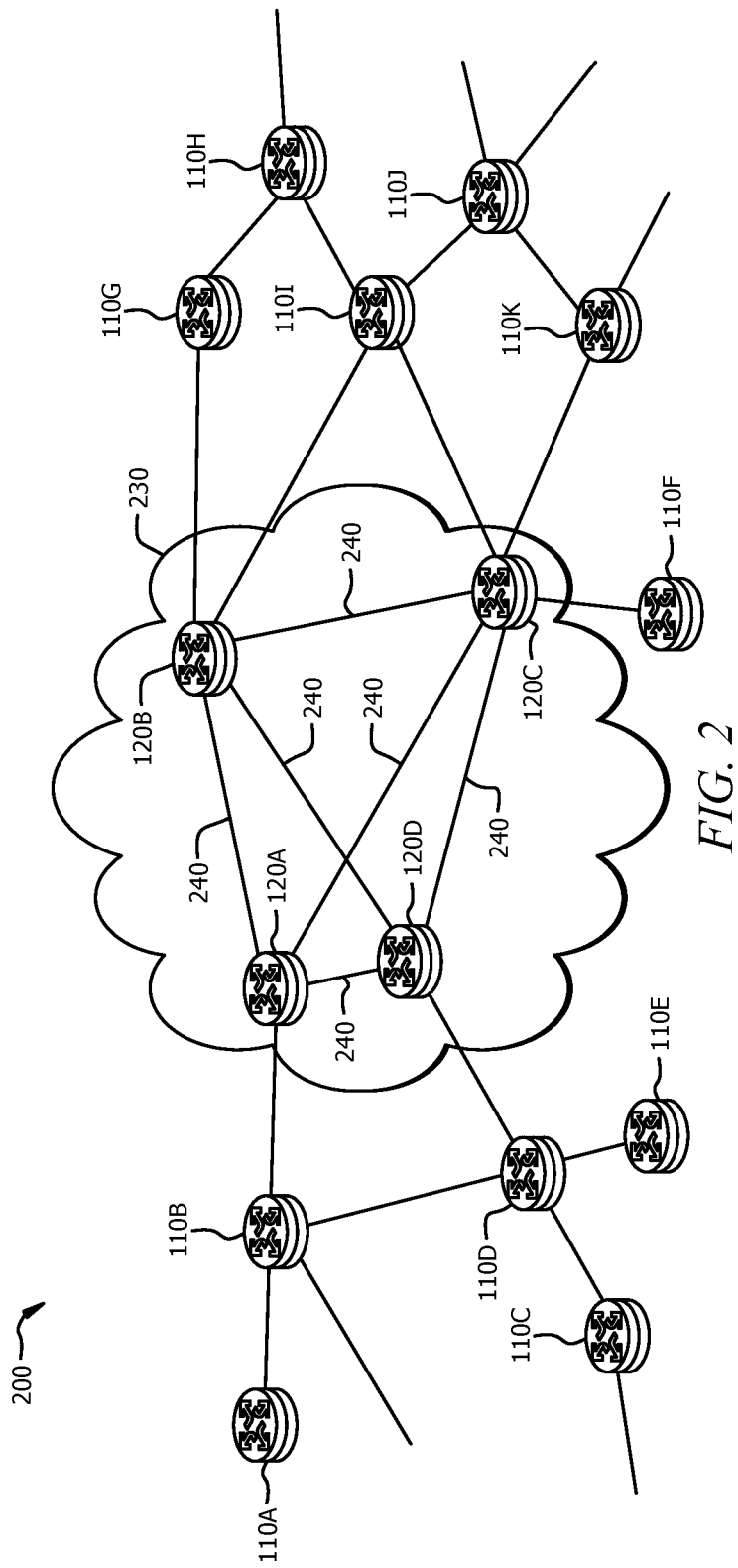
FIG. 2 is schematic diagram of another embodiment of a label switched system.

FIG. 2 is a schematic diagram of another embodiment of a label switched system 200. The label switched system 200 comprises the plurality of network nodes 110A-110K and a virtualized TTZ 230. A virtualized TTZ 230 may be configured such that TTZ links and TTZ internal nodes (e.g., TTZ internal nodes 122A-122F in FIG. 1) inside of the virtualized TTZ 230 are unknown to network nodes outside of the virtualized TTZ 230. In an embodiment, the virtualized TTZ 230 may be configured to appear as a group of fully connected TTZ edge nodes 120A-120D that connect to network nodes outside of the virtualized TTZ 230. A link between the TTZ edge nodes (e.g., a link between TTZ edge node 120A and TTZ edge node 120B) in a virtualized TTZ 230 may be a virtual link 240. A virtual link 240 may correspond to one of the paths between two TTZ edge nodes 120A-120D within TTZ 130 as described in FIG. 1. Using FIG. 1 as an example, the virtual link 240 between TTZ edge nodes 120A and 120B may correspond to the path that includes TTZ edge node 120A, TTZ internal node 122A, and TTZ edge node 120B in FIG. 1. In one embodiment, a virtual link may correspond to the shortest path or lowest cost link between a pair of TTZ edge nodes 120A-120D when multiple paths interconnect the pair of TTZ edge nodes. A network node outside of the virtualized TTZ 230 may not be aware of TTZ links within the virtualized TTZ 230, but may be aware of virtual links 240 within the virtualized TTZ 230. For example, a network node 110B may be aware of a virtual link 240 between TTZ edge node 120A and TTZ edge node 120B, a virtual link 240 between TTZ edge node 120A and TTZ edge node 120C, and a virtual link 240 between TTZ edge node 120A and TTZ edge node 120D. However, network node 110B may not be aware of any TTZ internal nodes (e.g., TTZ internal node 122A in FIG. 1) located along the virtual link 240 between the TTZ edge node 120A and the TTZ edge node 120B. Alternatively, the virtualized TTZ 230 may be configured to appear as a single router that connects to the network nodes 110A-110K outside of the virtualized TTZ 230.

Figure 3:
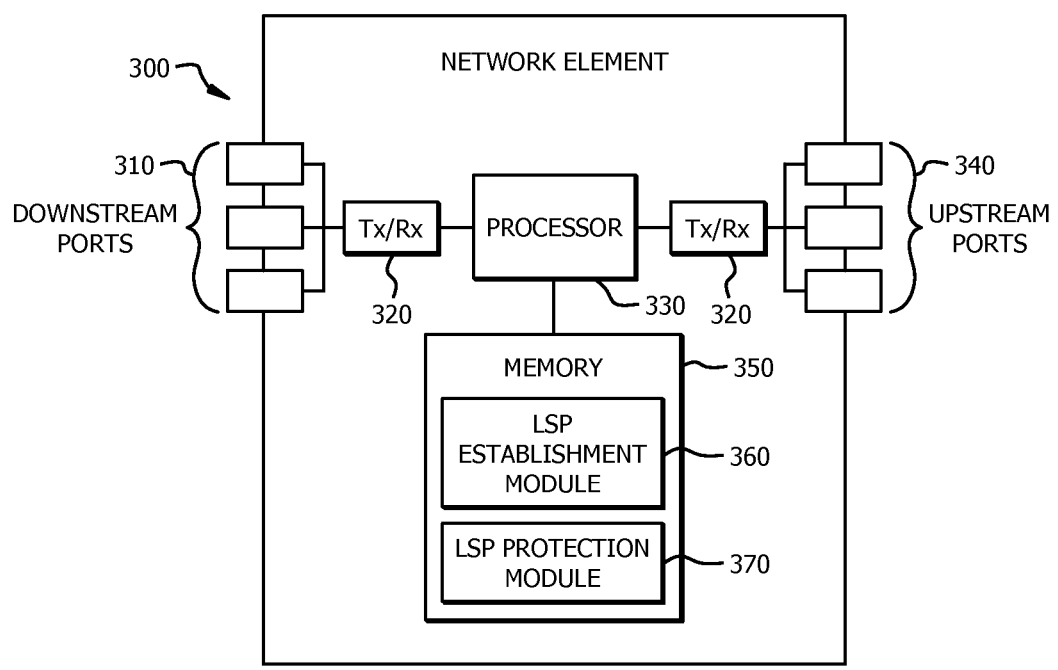
FIG. 3 is a schematic diagram of an embodiment of a network element.

FIG. 3 is a schematic diagram of an embodiment of a network element 300 that may be used to transport and process traffic through at least a portion of a label switched system 100 shown in FIG. 1. At least some of the features/methods described in the disclosure may be implemented in the network element 300. For instance, the features/methods of the disclosure may be implemented in hardware, firmware, and/or software installed to run on the hardware. The network element 300 may be any device (e.g., a switch, router, bridge, server, client, etc.) that transports data through a network, system, and/or domain. Moreover, the terms network "element," network "node," network "component," network "module," and/or similar terms may be interchangeably used to generally describe a network device and do not have a particular or special meaning unless otherwise specifically stated and/or claimed within the disclosure. In one example embodiment, the network element 300 may be an apparatus configured to establish one or more LSPs and/or to protect one or more LSPs. For example, network element 300 may be integrated within a network node 110A-110K, a TTZ edge node 120A-120D, and/or a TTZ internal node 122A-122F as described in FIG. 1.

The network element 300 may comprise one or more downstream ports 310 coupled to a transceiver (Tx/Rx) 320, which may be transmitters, receivers, or combinations thereof. The Tx/Rx 320 may transmit and/or receive frames from other network nodes via the downstream ports 310. Similarly, the network element 300 may comprise another Tx/Rx 320 coupled to a plurality of upstream ports 340, wherein the Tx/Rx 320 may transmit and/or receive frames from other nodes via the upstream ports 340. The downstream ports 310 and/or the upstream ports 340 may include electrical and/or optical transmitting and/or receiving components. In another example embodiment, the network element 300 may comprise one or more antennas coupled to the Tx/Rx 320. The Tx/Rx 320 may transmit and/or receive data (e.g., packets) from other network elements wirelessly via one or more antennas.

A processor 330 may be coupled to the Tx/Rx 320 and may be configured to process the frames and/or determine which nodes to send (e.g., transmit) the packets. In an example embodiment, the processor 330 may comprise one or more multi-core processors and/or memory modules 350, which may function as data stores, buffers, etc. The processor 330 may be implemented as a general processor or may be part of one or more application specific integrated circuits (ASICs), field-programmable gate arrays (FPGAs), and/or digital signal processors (DSPs). Although illustrated as a single processor, the processor 330 is not so limited and may comprise multiple processors. The processor 330 may be configured to establish one or more LSPs and/or to protect one or more LSPs.

FIG. 3 illustrates that a memory module 350 may be coupled to the processor 330 and may be a non-transitory medium configured to store various types of data. Memory module 350 may comprise memory devices including secondary storage, read-only memory (ROM), and random-access memory (RAM). The secondary storage is typically comprised of one or more disk drives, optical drives, solid-state drives (SSDs), and/or tape drives and is used for non-volatile storage of data and as an over-flow storage device if the RAM is not large enough to hold all working data. The secondary storage may be used to store programs that are loaded into the RAM when such programs are selected for execution. The ROM is used to store instructions and perhaps data that are read during program execution. The ROM is a non-volatile memory device that typically has a small memory capacity relative to the larger memory capacity of the secondary storage. The RAM is used to store volatile data and perhaps to store instructions. Access to both the ROM and RAM is typically faster than to the secondary storage.

The memory module 350 may be used to house the instructions for carrying out the various example embodiments described herein. In one example embodiment, the memory module 350 may comprise an LSP establishment module 360 and/or an LSP protection module 370 that may be implemented on the processor 330. In one embodiment, the LSP establishment module 360 may be implemented to establish one or more LSPs and/or one or more LSPs across a plurality of networks and a TTZ (e.g., TTZ 130 described in FIG. 1). The LSP protection module 370 may be implemented to protect one or more LPSs that crosses a plurality of networks and a TTZ.

It is understood that by programming and/or loading executable instructions onto the network element 300, at least one of the processor 330, the cache, and the long-term storage are changed, transforming the network element 300 in part into a particular machine or apparatus, for example, a multi-core forwarding architecture having the novel functionality taught by the present disclosure. It is fundamental to the electrical engineering and software engineering arts that functionality that can be implemented by loading executable software into a computer can be converted to a hardware implementation by well-known design rules known in the art. Decisions between implementing a concept in software versus hardware typically hinge on considerations of stability of the design and number of units to be produced rather than any issues involved in translating from the software domain to the hardware domain. Generally, a design that is still subject to frequent change may be preferred to be implemented in software, because re-spinning a hardware implementation is more expensive than re-spinning a software design. Generally, a design that is stable will be produced in large volume may be preferred to be implemented in hardware (e.g., in an ASIC) because for large production runs the hardware implementation may be less expensive than software implementations. Often a design may be developed and tested in a software form and then later transformed, by well-known design rules known in the art, to an equivalent hardware implementation in an ASIC that hardwires the instructions of the software. In the same manner as a machine controlled by a new ASIC is a particular machine or apparatus, likewise a computer that has been programmed and/or loaded with executable instructions may be viewed as a particular machine or apparatus.

Any processing of the present disclosure may be implemented by causing a processor (e.g., a general purpose multi-core processor) to execute a computer program. In this case, a computer program product can be provided to a computer or a network device using any type of non-transitory computer readable media. The computer program product may be stored in a non-transitory computer readable medium in the computer or the network device. Non-transitory computer readable media include any type of tangible storage media. Examples of non-transitory computer readable media include magnetic storage media (such as floppy disks, magnetic tapes, hard disk drives, etc.), optical magnetic storage media (e.g. magneto-optical disks), compact disc read-only memory (CD-ROM), compact disc recordable (CD-R), compact disc rewritable (CD-R/W), digital versatile disc (DVD), Blu-ray (registered trademark) disc (BD), and semiconductor memories (such as mask ROM, programmable ROM (PROM), erasable PROM), flash ROM, and RAM). The computer program product may also be provided to a computer or a network device using any type of transitory computer readable media. Examples of transitory computer readable media include electric signals, optical signals, and electromagnetic waves. Transitory computer readable media can provide the program to a computer via a wired communication line (e.g. electric wires, and optical fibers) or a wireless communication line.

Figure 4:
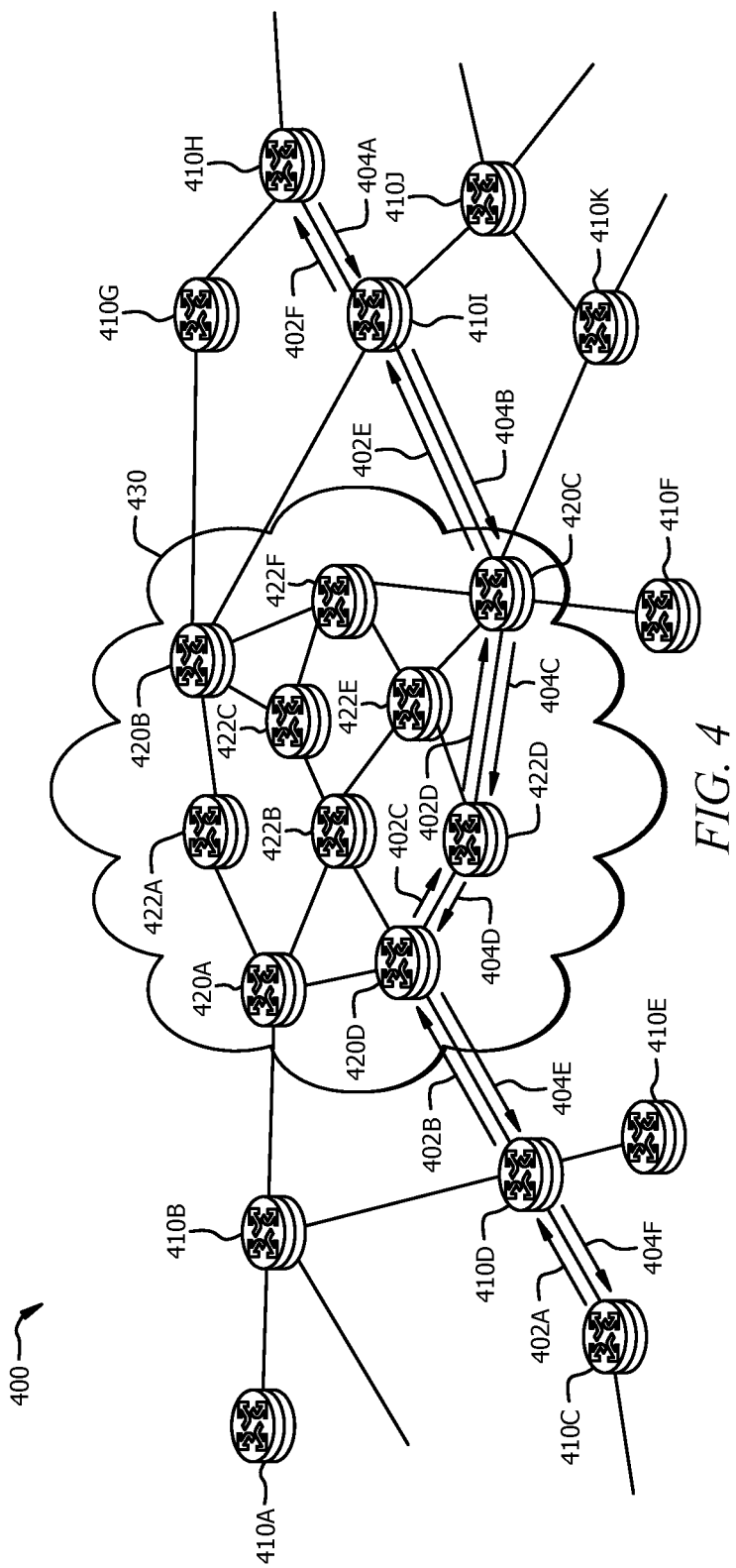
FIG. 4 is a schematic diagram of an embodiment of a label switched system establishing an LSP.

FIG. 4 is a schematic diagram of an embodiment of a label switched system 400 establishing an LSP. The label switched system 400 comprises a plurality of network nodes 410A-410K and a TTZ 430 which comprises a plurality of TTZ edge nodes 420A-420D and a plurality of TTZ internal nodes 422A-422F. The plurality of network nodes 410A-410K, the TTZ 430, the TTZ edge nodes 420A-420D, and the TTZ internal nodes 422A-422F may be configured substantially similar to the plurality of network nodes 110A-110K, the TTZ 130, TTZ edge nodes 120A-120D, and TTZ internal nodes 122A-122F described in FIG. 1, respectively.

The label switched system 400 may be configured to compute and/or to establish an LSP across TTZ 430 and between network nodes 410C and 410H. Network node 410C may be configured as a source node or a head node in a first network. Network node 410H may be configured as a destination node or a tail node in a second network. Network node 410C may be configured to compute and/or determine a path from network node 410C to network node 410H. Network node 410C may be configured to be aware of the TTZ edge nodes 420A-420D within TTZ 430, but may not be aware of the TTZ internal nodes 422A-422F within the TTZ 430. For example, network node 410C may compute a path that comprises network nodes 410C and 410D, TTZ edge nodes 420D and 420C, and network nodes 410I and 410H. Network node 410C may be configured to send a resource reservation protocol (RSVP) path (PATH) message 402A to network node 410D along the computed path. The PATH message may be similar to the PATH messages defined by Internet Engineering Task Force (IETF) Request for Comments (RFC) 6510, which is hereby incorporated by reference as if reproduced in its entirety. In one embodiment, a PATH message may comprise routing information, such as, a list of next-hops or network nodes along the computed path and a label request object. The routing information may reference a plurality of network nodes along the computed path. The routing information may include, but is not limited to, an explicit route object (ERO), a record route object (RRO), or any other suitable data structure as would be appreciated by one of ordinary skill in the art upon viewing this disclosure. A label request object may indicate a request for a label or an identifier for a tunnel or path between the sending and receiving nodes (e.g., network nodes 410A-410K, TTZ edge nodes 420A-420D, and/or TTZ internal nodes 422A-422F). Network node 410D may be configured to receive the PATH message 402A, to update the PATH message to generate a PATH message 402B, and to send the PATH message 402B to TTZ edge node 420D along the computed path. Updating the PATH message may comprise removing a reference to the receiving node from the routing information and/or determining the next-hop using the routing information.

A TTZ edge node (e.g., TTZ edge node 420D) that receives data traffic from outside of TTZ 430 and sends the data traffic into TTZ 430 may be referred to as an ingress TTZ edge node. TTZ edge node 420D may be configured to receive the PATH message 402B and to compute a TTZ path through TTZ 430 to TTZ edge node 420C. A TTZ path may be a path within TTZ 430 that comprises one or more TTZ edge nodes 420A-420D and/or one or more TTZ internal nodes 422A-422F. Routing information for the TTZ path may not be shared with network nodes outside of TTZ 430. For instance, TTZ edge node 420D may compute a TTZ path that comprises TTZ internal node 422D and TTZ edge node 420C. TTZ edge node 420D may also be configured to update the PATH message 402B to generate a PATH message 402C and to send the PATH message 402C to TTZ internal node 422D along the computed path. TTZ internal node 422D may be configured to receive the PATH message 402C, to update the PATH message 402C to generate a PATH message 402D, and to send the PATH message 402D to TTZ edge node 420C along the computed path. A TTZ edge node (e.g., TTZ edge node 420C) that receives data traffic from TTZ 430 and sends the data traffic outside of TTZ 430 may be referred to as an egress TTZ edge node. TTZ edge node 420C may be configured to receive the PATH message 402D and to update the PATH message 402D to generate a PATH message 402E, to record a virtual link between TTZ edge nodes 420D and 420C as one hop into the PATH message 402E after removing other hops from between TTZ edge nodes 420D and 420C, and to send the PATH message 402E to network node 410I along the computed path. Network node 410I may be configured to receive the PATH message 402E, to update the PATH message 402E to generate PATH message 402F, and to send the PATH message 402F to network node 410H along the computed path.

Network node 410H may be configured to receive the PATH message 402F, to allocate a label for the computed path, and to send a RSVP reservation (RESV) message 404A that comprises the label to network node 410I. The RESV message may be similar to the RESV messages defined by IETF RFC 6510. The label may be employed by a network node to reference or identify a tunnel or path between the sending and receiving nodes. For instance, the label allocated by network node 410H may be used to indicate an incoming label in a label forwarding information base (LFIB) for network node 410H and an outgoing label in an LFIB for network node 410I. Network node 410I may be configured to receive the RESV message 404A, to allocate a label for the computed path, and to send a RESV message 404B that comprises the label to TTZ edge node 420C. TTZ edge node 420C may be configured to receive the RESV message 404B, to allocate a label for the computed path, and to send a RESV message 404C that comprises the label to TTZ internal node 422D. TTZ internal node 422D may be configured to receive the RESV message 404C, to allocate a label for the computed path, and to send a RESV message 404D that comprises the label to TTZ edge node 420D. TTZ edge node 420D may be configured to receive the RESV message 404D, to record the label allocated by TTZ edge node 420C into a RESV message 404E after removing the recorded labels allocated by the TTZ internal nodes (e.g., TTZ internal node 422D) along the computed path, to allocate a label for the computed path, and to send the RESV message 404E that comprises the labels allocated by TTZ edge node 420D and 420C to network node 410D. In an embodiment, TTZ edge node 420D may be configured to not record one or more labels allocated by TTZ internal nodes 422A-422F within TTZ 430 into a RESV message. Network node 410D may be configured to receive the RESV message 404E, to allocate a label for the computed path, and to send a RESV message 404F that comprises the label to network node 410C. Network node 410C may be configured to receive the RESV message 404F and to store one or more labels for the LSP between network nodes 410C and 410H.

Figure 5:
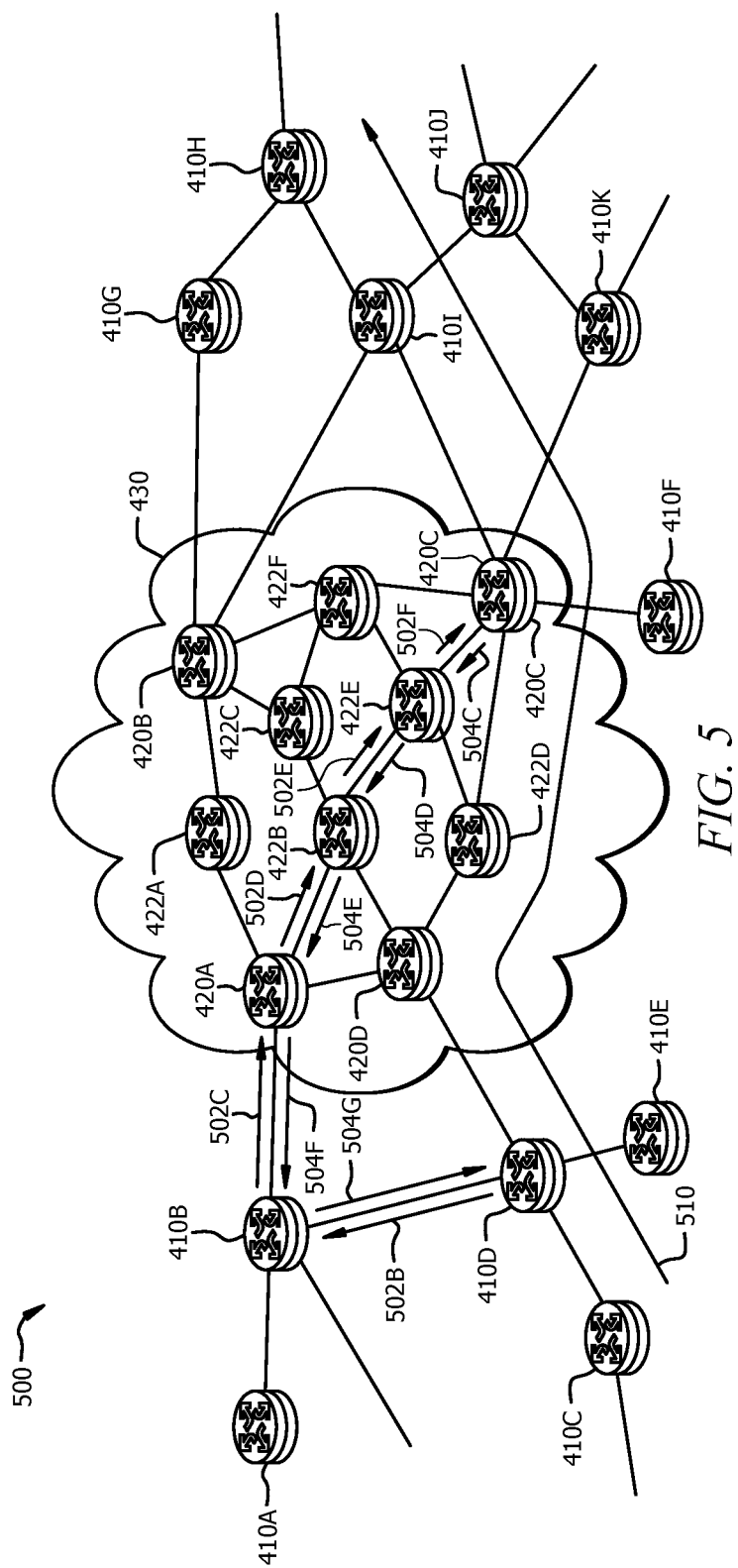
FIG. 5 is a schematic diagram of an embodiment of a label switched system establishing an LSP that protects an ingress TTZ edge node.

FIG. 5 is a schematic diagram of an embodiment of a label switched system 500 establishing an LSP that protects an ingress TTZ edge node. The label switched system 500 comprises the plurality of network nodes 410A-410K and the TTZ 430 which comprises the plurality of TTZ edge nodes 420A-420D and the plurality of TTZ internal nodes 422A-422F as described in FIG. 4. The label switched system 500 may comprise a first LSP 510 and may be configured to compute and/or to establish a second LSP (e.g., a backup LSP) from the previous hop node (e.g., network node 410D) to the next-hop node (e.g., TTZ edge node 420C) of the ingress TTZ edge node (e.g., TTZ edge node 420D). The first LSP 510 may comprise a path that comprises network nodes 410C and 410D, TTZ edge node 420D, TTZ internal node 422D, TTZ edge node 420C, and network nodes 410I and 410H. In one embodiment, the previous hop node of the ingress TTZ edge node (e.g., network node 410D) may be configured to compute and/or determine a second path from the network node 410D to TTZ edge node 420C. For example, the second path may comprise network nodes 410D and 410B, and TTZ edge nodes 420A and 420C. When a fault in the ingress TTZ edge node is detected along the first LSP 510, a previous hop node of the ingress TTZ edge node (e.g., network node 410D) along the first LSP 510 may be configured to reroute data traffic from the first LSP 510 to the second LSP. The next-hop node of the ingress TTZ edge node (e.g., TTZ edge node 420C) along the first LSP 510 may be configured to merge data traffic from the second LSP to the first LSP 510.

Network node 410D may be configured to send a PATH message 502B (e.g., a PATH message as described in FIG. 4) to network node 410B along the computed path. Network node 410B may be configured to receive the PATH message 502B, to update the PATH message 502B to generate a PATH message 502C, and to send the PATH message 502C to TTZ edge node 420A along the computed path. TTZ edge node 420A may be configured to receive the PATH message 502C and to compute a TTZ path from TTZ edge node 420A to TTZ edge node 420C. For instance, TTZ edge node 420A may compute a TTZ path within TTZ 430 that comprises TTZ internal nodes 422B and 422E and TTZ edge node 420C. TTZ edge node 420A may also be configured to update the PATH message 502C to generate a PATH message 502D and to send the PATH message 502D to TTZ internal node 422B along the computed path. TTZ internal node 422B may be configured to receive the PATH message 502D, to update the PATH message 502D to generate a PATH message 502E, and to send the PATH message 502E to TTZ internal node 422E along the computed path. TTZ internal node 422E may be configured to receive the PATH message 502E, to update the PATH message 502E to generate a PATH message 502F, and to send the PATH message 502F to TTZ edge node 420C along the computed path.

TTZ edge node 420C may be configured receive the PATH message 502F, to allocate a label for the path, and to send a RESV message 504C that comprises the label to TTZ internal node 422E. TTZ internal node 422E may be configured to receive the RESV message 504C, to allocate a label for the path, and to send a RESV message 504D that comprises the label to TTZ internal node 422B. TTZ internal node 422B may be configured to receive the RESV message 504D, to allocate a label for the path, and to send a RESV message 504E that comprises the label to TTZ edge node 420A. TTZ edge node 420A may be configured to receive the RESV message 504E, to record the label allocated by TTZ edge node 420C into a RESV message 504F after removing the recorded labels allocated by the TTZ internal nodes along the computed path, to allocate a label for the path, and to send the RESV message 504F that comprises the labels for TTZ edge nodes 420A and 420C to network node 410B. Network node 410B may be configured to receive the RESV message 504F, to allocate a label for the path, and to send a RESV message 504G that comprises the label to network node 410D. Network node 410D may be configured to receive the RESV message 504G and to store one or more labels for the LSP between the network nodes 410D and TTZ edge node 420C, and to associate the second LSP with the first LSP 510.

Figure 6:
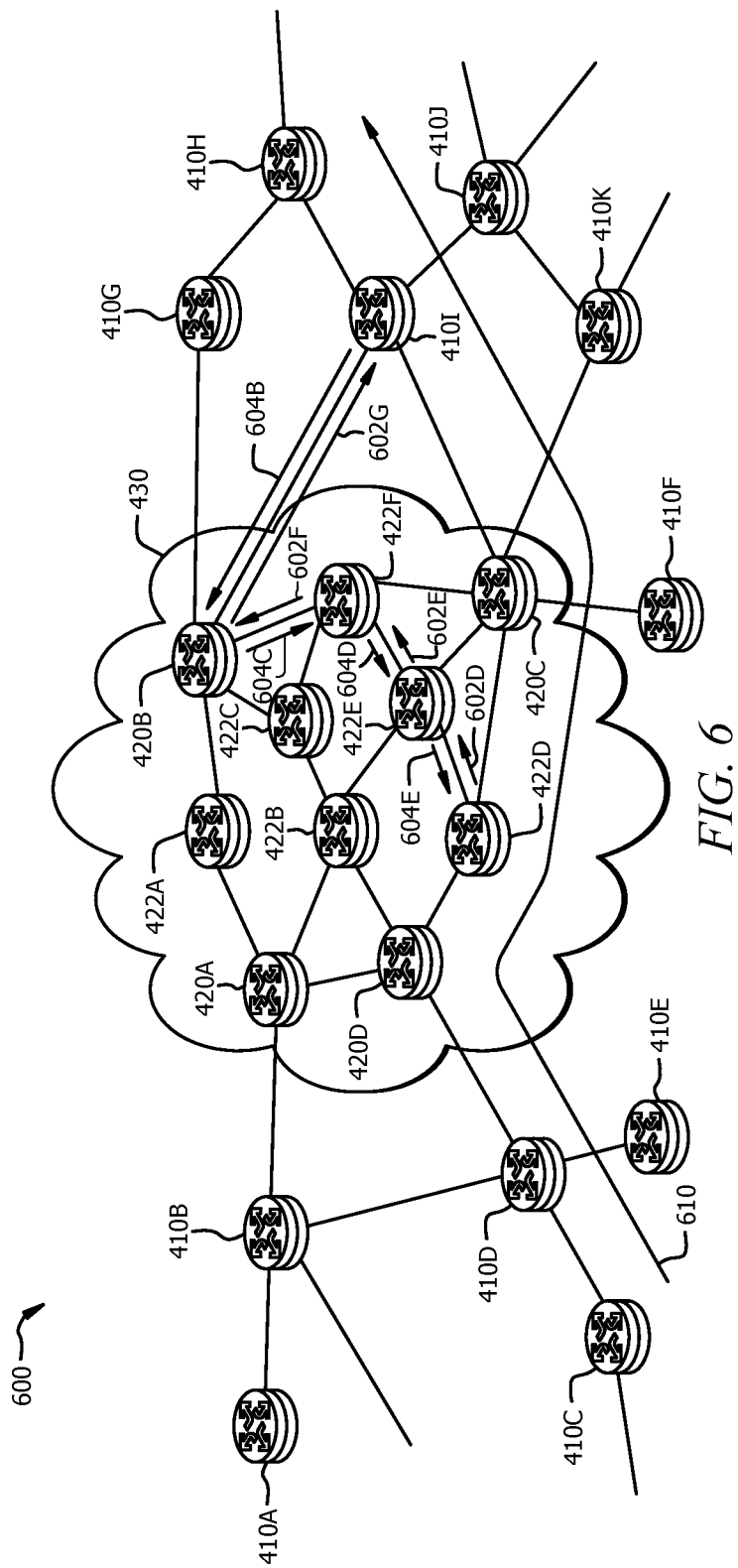
FIG. 6 is a schematic diagram of an embodiment of a label switched system establishing an LSP that protects an egress TTZ edge node.

FIG. 6 is a schematic diagram of an embodiment of a label switched system 600 establishing an LSP that protects an egress TTZ edge node. The label switched system 600 comprises the plurality of network nodes 410A-410K and the TTZ 430 which comprises the plurality of TTZ edge nodes 420A-420D and the plurality of TTZ internal nodes 422A-422F as described in FIG. 4. The label switched system 600 may comprise a first LSP 610 and may be configured to compute and/or to establish a second LSP (e.g., a backup LSP) across TTZ 430 and from TTZ internal node 422D to network node 410I. The first LSP 610 may comprise a path that comprises network nodes 410C and 410D, TTZ edge node 420D, TTZ internal node 422D, TTZ edge node 420C, and network nodes 410I and 410H. In one embodiment, the previous hop node of the egress TTZ edge node (e.g., TTZ internal node 422D) may be configured to compute and/or determine the second path from the TTZ internal node 422D to network node 410I. For example, TTZ internal node 422D may compute and/or establish the second LSP that may comprise TTZ internal nodes 422D, 422E, and 422F, TTZ edge node 420B, and network node 410I. When a fault in the TTZ edge node 420C is detected along the first LSP 610, the previous hop node of the egress TTZ edge node (e.g., TTZ internal node 422D) along the first LSP 610 may be configured to reroute data traffic from the first LSP 610 to the second LSP. The next-hop node of the egress TTZ edge node (e.g., network node 410I) along the first LSP 610 may be configured to merge the data traffic from the second LSP to the first LSP 610.

TTZ internal node 422D may be configured to send a PATH message 602D (e.g., a PATH message as described in FIG. 4) to TTZ internal node 422E along the computed path. TTZ internal node 422E may be configured to receive the PATH message 602D, to update the PATH message 602D to generate a PATH message 602E, and to send the PATH message 602E to TTZ internal node 422F along the computed path. TTZ internal node 422F may be configured to receive the PATH message 602E, to update the PATH message 602E to generate a PATH message 602F, and to send the PATH message 602F to TTZ edge node 420B along the computed path. TTZ edge node 420B may be configured to receive the PATH message 602F and update the PATH message 602F to generate a PATH message 602G, and to send the PATH message 602G to network node 410I along the computed path.

Network node 410I may be configured to receive the PATH message 602G, to allocate a label for the path, and to send a RESV message 604B (e.g., a RESV message as described in FIG. 4) that comprises the label to TTZ edge node 420B. TTZ edge node 420B may be configured to receive the RESV message 604B, to allocate a label for the path, and to send a RESV message 604C that comprises the label to TTZ internal node 422F. TTZ internal node 422F may be configured to receive the RESV message 604C, to allocate a label for the path, and to send a RESV message 604D that comprises the label to TTZ internal node 422E. TTZ internal node 422E may be configured to receive the RESV message 604D, to allocate a label for the path, and to send a RESV message 604E that comprises the label to TTZ internal node 422D. TTZ internal node 422D may be configured to receive the RESV message 604E, to store one or more labels for the LSP between the TTZ internal node 422D and network node 410I, and to associate the second LSP with the first LSP 610.

Figure 7:
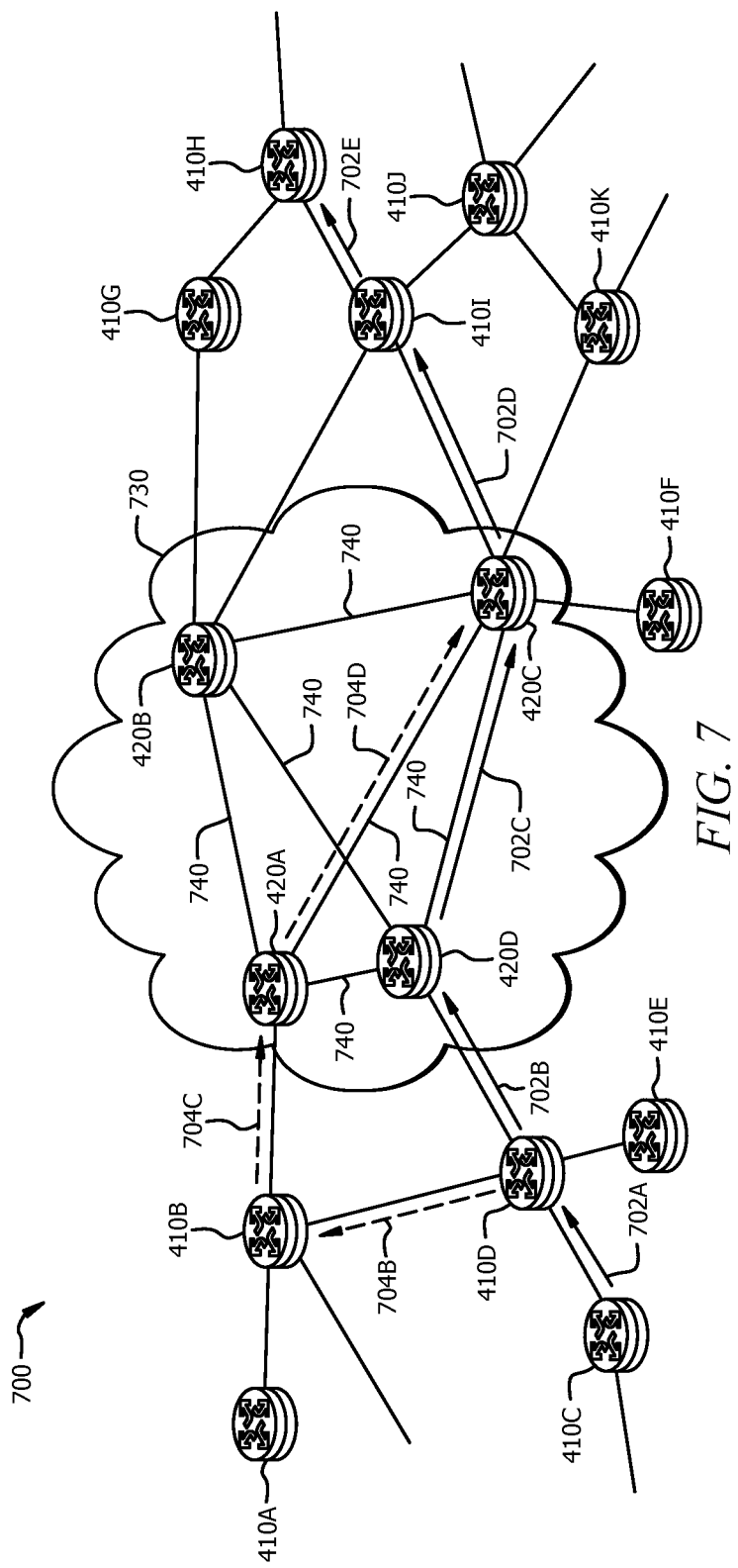
FIG. 7 is a schematic diagram of an embodiment of a label switched system implementing a primary LSP and a backup LSP.

FIG. 7 is a schematic diagram of an embodiment of a label switched system 700 implementing a primary LSP 702A-702E and a backup LSP 704B-704D across a TTZ 730. The label switched system 700 comprises the plurality of network nodes 410A-410K as described in FIG. 4 and TTZ 730. TTZ 730 may be a virtualized implementation of TTZ 430 described in FIG. 4 and may comprise the plurality of TTZ edge nodes 420A-420D described in FIG. 4. The TTZ edge nodes 420A-420D may be interconnected using a plurality of virtual links 740 (e.g., virtual links 240 described in FIG. 2). Network node 410C may be configured as a source node. Network node 410H may be configured as a destination node. In one embodiment, the primary LSP 702A-702E may be established as described in FIG. 4. The primary LSP 702A-702E may comprise a path along network nodes 410C and 410D, TTZ edge nodes 420D and 420C, and network nodes 410I and 410H. The backup LSP 704B-704D may be established as described in FIG. 5. The backup LSP 704B-704D may comprise a path along network nodes 410D, and 410B, and TTZ edge nodes 420A and 420C.

The label switched network 700 may be configured to communicate data traffic across TTZ 730 along the primary LSP 702A-702E during typical operation when a fault is not present along the primary LSP 702A-702E. When a fault in the ingress TTZ edge node (e.g., TTZ edge node 420D) is detected along the primary LSP 702A-702E, the switched label system 700 may be configured to communicate data traffic across TTZ 730 along the backup LSP 704B-704D. For example, if a fault occurs at TTZ edge node 420D, the data traffic may be communicated across the TTZ 730 using the backup LSP 704B-704D. Network node 410D may be configured to switch the data traffic from the primary LSP 702A-702E into the backup LSP 704B-704D when a fault is detected in ingress TTZ edge node. The egress TTZ edge node (e.g., TTZ edge node 420C) may be configured to merge the data traffic from the backup LSP into the primary LSP. A fault may include, but is not limited to, a link fault or a network node fault. In one embodiment, a fault may be detected using a Bidirectional Forwarding Detection (BFD) session between network node 410D and TTZ edge node 420D. Alternatively, a fault may be detected using any other suitable methods of detecting a link fault and/or a network node fault as would be appreciated by one of ordinary skill in the art upon viewing this disclosure. When a fault occurs, a fault message may be communicated to the source node (e.g., network node 410C). The fault message may indicate a fault has occurred and/or identify the location of the fault.

Figure 8:
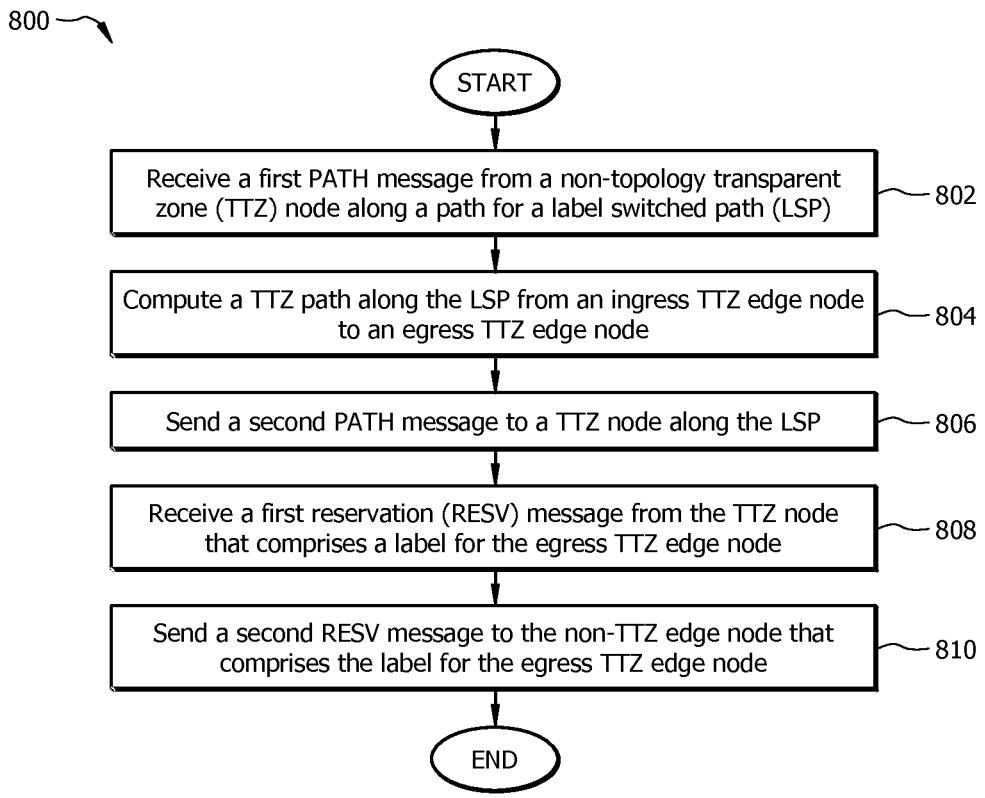
FIG. 8 is a flowchart of an embodiment of a label switched path establishment method.

FIG. 8 is a flowchart of another embodiment of an LSP establishment method 800. In an embodiment, an ingress TTZ edge node (e.g., TTZ edge node 420D described in FIG. 4) may be configured to implement method 800 to establish an LSP across a TTZ. At step 802, method 800 may receive a first PATH message from a non-TTZ node (e.g., a network node outside of the TTZ) along a path for an LSP. The PATH message may comprise routing information and a label request object. The routing information may reference a plurality of next-hops (e.g., network nodes) along the path. The label request object may indicate a request for a label for the path. At step 804, method 800 may compute a TTZ path within the TTZ along the path for the LSP. The TTZ path may comprise a path of one or more TTZ nodes from the ingress TTZ edge node to an egress TTZ edge node. At step 806, method 800 may send a second PATH message to another TTZ node (e.g., TTZ internal node or TTZ edge node) along the path for the LSP. Method 800 may generate and/or send the second PATH to another TTZ node along the path for the LSP. The second PATH message may comprise the computed TTZ path. At step 808, method 800 may receive a first RESV message from the TTZ node that comprises a label allocated for the egress TTZ edge node. The label allocated for the egress TTZ node may be used to identify the egress TTZ edge node along the LSP and/or employed for routing to the egress TTZ node. At step 810, method 800 may send a second RESV message that comprises the label allocated for the egress TTZ edge node and a label allocated for the ingress TTZ edge node to the non-TTZ node along the path for the LSP. The second RESV message may be configured to not comprise one or more labels allocated by a TTZ internal node along the path for the LSP. For example, the second RESV message may not comprise any labels allocated by a TTZ internal node along the path for the LSP.

Figure 9:
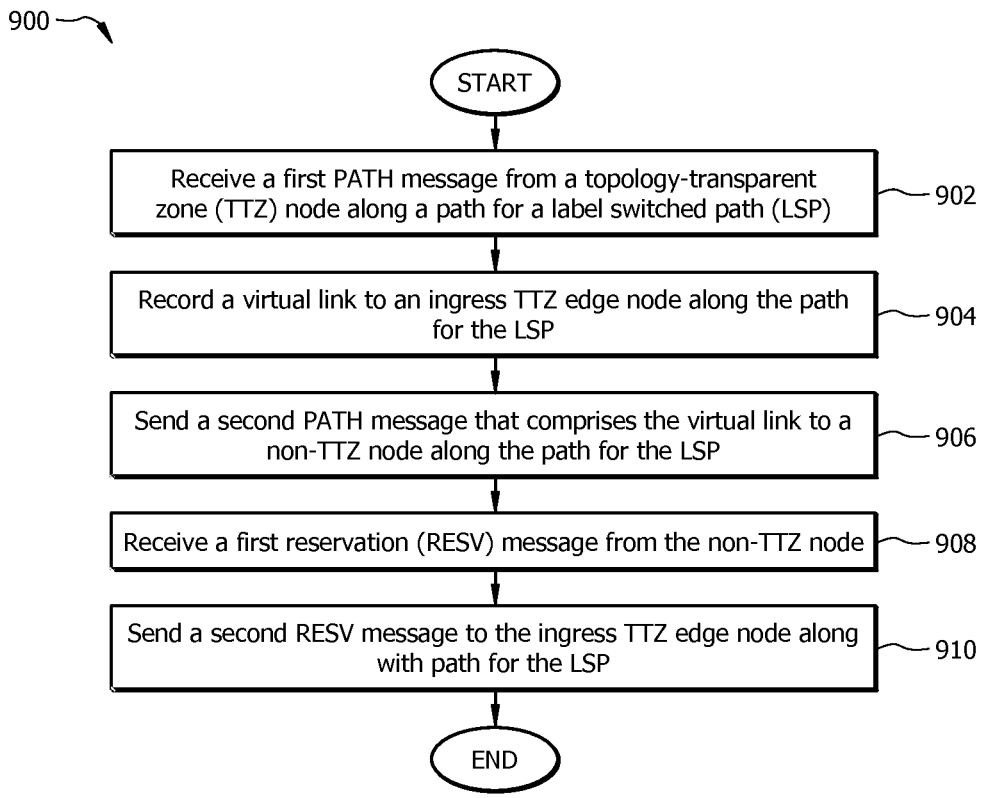
FIG. 9 is a flowchart of another embodiment of a label switched path establishment method.

FIG. 9 is a flowchart of an embodiment of an LSP establishment method 900. In an embodiment, an egress TTZ edge node (e.g., TTZ edge node 420C described in FIG. 4) may be configured to implement method 900 to establish an LSP across the TTZ. At step 902, method 900 may receive a first PATH message from a TTZ node (e.g., TTZ internal node or TTZ edge node) along a path for an LSP. The PATH message may comprise routing information and a label request object. The routing information may reference a plurality of next-hops (e.g., network nodes) along the path for the LSP and/or a computed TTZ path within the TTZ. The label request object may indicate a request for a label for the path. At step 904, method 900 may record a virtual link (e.g., virtual link 240 described in FIG. 4) to an ingress TTZ edge node for the TTZ along the path for the LSP. Method 900 may determine the ingress TTZ edge node using the PATH message (e.g., the routing information) and/or the TTZ topology information and may record the virtual link to the ingress TTZ edge node after removing the path information (e.g., the hops and/or the nodes that the LSP traverses) within the TTZ. At step 906, method 900 may send a second PATH message that comprises a reference to the virtual link to a non-TTZ node (e.g., a network node outside of the TTZ) along the path for the LSP. At step 908, method 900 may receive a first RESV message from the non-TTZ node along the path for the LSP. The first RESV message may comprise a label for routing to the non-TTZ node. At step 910, method 900 may send a second RESV message to the TTZ node along the path for the LSP. The second RESV message may comprise a label for routing to the egress TTZ node.

Figure 10:
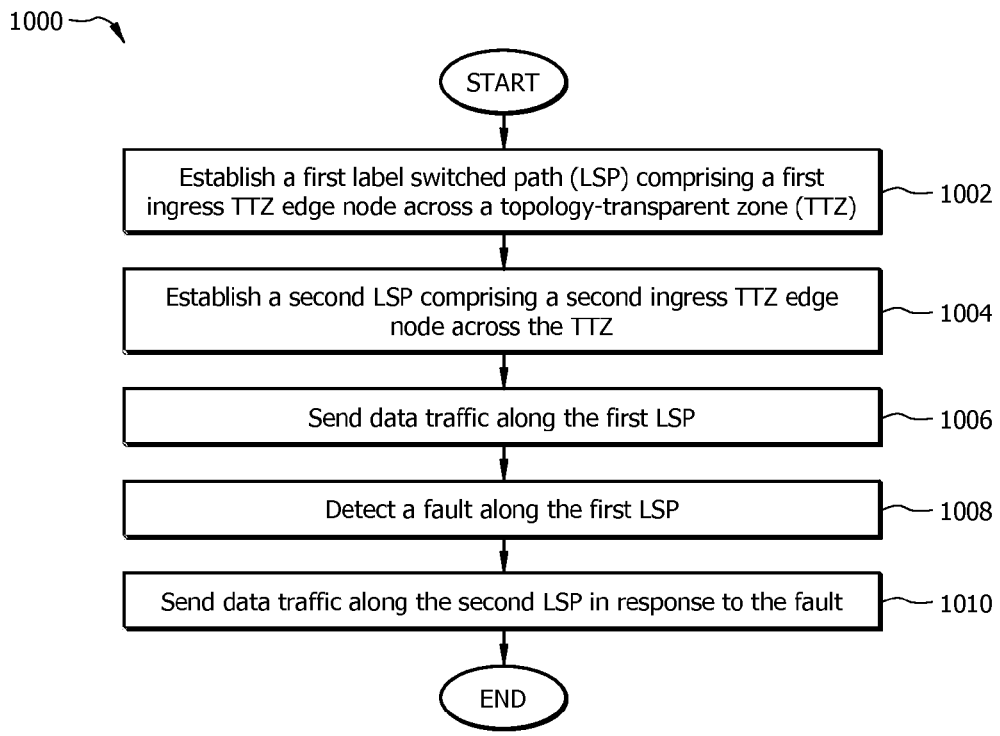
FIG. 10 is a flowchart of an embodiment of a label switched path protection method.

FIG. 10 is a flowchart of an embodiment of an LSP protection method 1000. In an embodiment, a network node (e.g., network node 410D described in FIG. 5) may be configured to implement method 1000 to protect one or more LSPs that cross a TTZ. At step 1002, method 1000 may establish a first LSP comprising an ingress TTZ edge node across a TTZ. In an embodiment the first LSP may be established similar to as describe in FIG. 4. The first LSP may comprise a plurality of network nodes and a plurality of TTZ nodes. The plurality of network nodes may comprise a source node and a destination node. The plurality of TTZ nodes may be configured to form a TTZ path through the TTZ that comprises an ingress TTZ edge node, one or more TTZ internal nodes, and an egress TTZ edge node. At step 1004, method 1000 may establish a second (e.g., a backup) LSP comprising a second ingress TTZ edge node across the TTZ. In an embodiment, the second LSP may be established similar to as describe in FIG. 5. The second LSP may comprise the previous hop node of the ingress TTZ edge node as the source node and the next-hop of the ingress TTZ edge node as the destination node. The second LSP may comprise the plurality of network nodes and a second plurality of TTZ nodes. The second plurality of TTZ nodes may be configured to form a second TTZ path through the TTZ that comprises a second ingress TTZ edge node, one or more TTZ internal nodes, and the egress TTZ edge node. At step 1006, method 1000 may send data traffic along the first LSP. Method 1000 may send data traffic from the source node to the destination node using the first LSP. At step 1008, method 1000 may detect a fault in the ingress TTZ edge node along the first LSP. Method 1000 may employ one or more fault detection methods as described in FIG. 7 to detect a fault along the first LSP. For example, method 1000 may use a BFD session between the previous hop node of the ingress TTZ edge node and the ingress TTZ edge node to detect a fault in the ingress TTZ edge node along the first LSP. At step 1010, method 1000 may switch data traffic into the second LSP from the first LSP in response to the fault in the ingress TTZ edge node along the first LSP. Method 1000 may be implemented in the next-hop node of the ingress TTZ node and merge the data traffic back into the first LSP from the second LSP.

Figure 11:
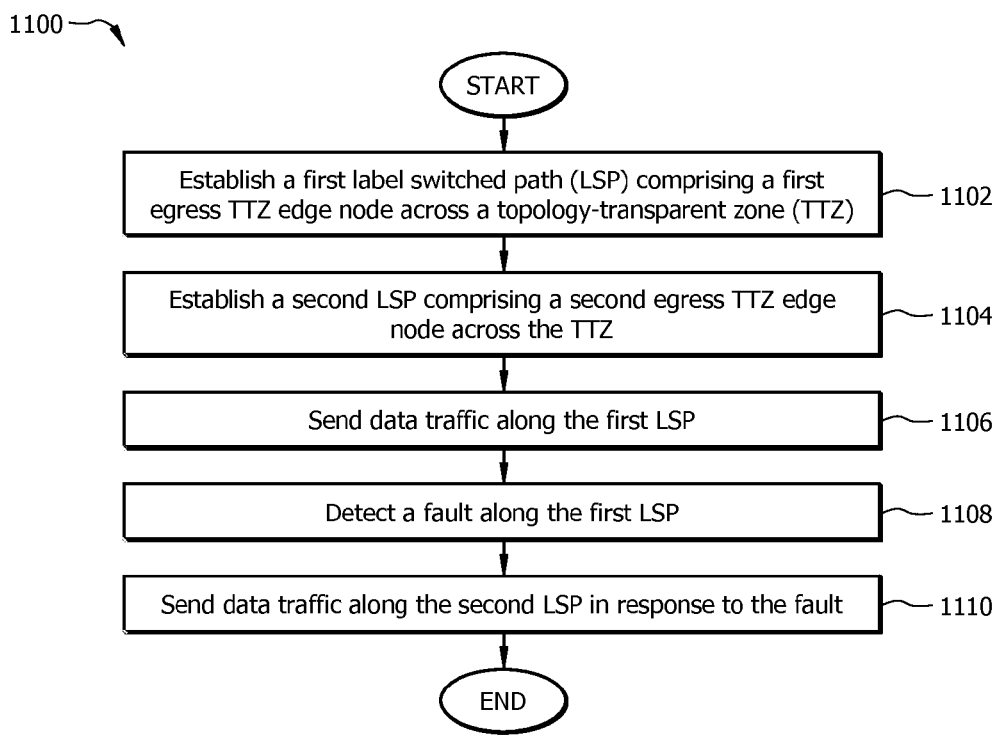
FIG. 11 is a flowchart of another embodiment of a label switched path protection method.

FIG. 11 is a flowchart of another embodiment of an LSP protection method 1100. In an embodiment, a TTZ node (e.g., internal TTZ node 422D described in FIG. 6) may be configured to implement method 1100 to protect one or more LSPs that cross a TTZ. At step 1102, method 1100 may establish a first LSP comprising an egress TTZ edge node across a TTZ. In an embodiment, the first LSP may be established similar to as describe in FIG. 4. The first LSP may comprise a plurality of network nodes and a plurality of TTZ nodes. The plurality of network nodes may comprise a source node and a destination node. The plurality of TTZ nodes may be configured to form a TTZ path through the TTZ that comprises an ingress TTZ edge node, one or more TTZ internal nodes, and an egress TTZ edge node. At step 1104, method 1100 may establish a second (e.g., a backup) LSP comprising a second egress TTZ edge node across the TTZ. In an embodiment, the second LSP may be established similar to as describe in FIG. 6. The second LSP may comprise the previous hop node of the egress TTZ edge node as its source node and the next-hop node of the egress TTZ edge node as its destination node. The second LSP may comprise the plurality of network nodes and a second plurality of TTZ nodes. The second plurality of TTZ nodes may be configured to form a second TTZ path through the TTZ that comprises one or more TTZ internal nodes, and a second egress TTZ edge node. At step 1106, method 1100 may send data traffic along the first LSP. Method 1100 may send data traffic from the source node to the destination node using the first LSP. At step 1108, method 1100 may detect a fault in the egress TTZ edge node along the first LSP. Method 1100 may employ one or more fault detection methods as described in FIG. 7 to detect a fault in the egress TTZ edge node along the first LSP. For example, method 1100 may use a BFD session between the previous hop node and the egress TTZ node to detect a fault in the egress TTZ edge node along the first LSP. Alternatively, detecting a fault may comprise receiving a fault message from another node along the first LSP in response to determining a fault has occurred along the first LSP. In one embodiment, method 1100 may detect a fault at the first egress TTZ edge node. At step 1110, method 1100 may switch data traffic into the second LSP from the first LSP in response to the fault in the egress TTZ edge node along the first LSP. Method 1100 may be implemented in the next-hop node of the egress TTZ node and may merge data traffic back into the first LSP from the second LSP.

Additional information about establishing an LSP that crosses a plurality of networks and a TTZ and/or protecting an LSP that crosses a plurality of networks and the TTZ may be as described in IETF Draft draft-chen-ospf-te-ttz entitled "TE LSP Crossing Topology-Transparent Zones," by Huaimo Chen, et al., which is hereby incorporated by reference as if reproduced in its entirety.

At least one embodiment is disclosed and variations, combinations, and/or modifications of the embodiment(s) and/or features of the embodiment(s) made by a person having ordinary skill in the art are within the scope of the disclosure. Alternative embodiments that result from combining, integrating, and/or omitting features of the embodiment(s) are also within the scope of the disclosure. Where numerical ranges or limitations are expressly stated, such express ranges or limitations should be understood to include iterative ranges or limitations of like magnitude falling within the expressly stated ranges or limitations (e.g., from about 1 to about 10 includes, 2, 3, 4, etc.; greater than 0.10 includes 0.11, 0.12, 0.13, etc.). For example, whenever a numerical range with a lower limit, $R_l$, and an upper limit, $R_u$, is disclosed, any number falling within the range is specifically disclosed. In particular, the following numbers within the range are specifically disclosed: $R=R_l+k*(R_u-R_l)$, wherein k is a variable ranging from 1 percent to 100 percent with a 1 percent increment, e.g., k is 1 percent, 2 percent, 3 percent, 4 percent, 5 percent, . . . 50 percent, 51 percent, 52 percent, . . . , 95 percent, 96 percent, 97 percent, 98 percent, 99 percent, or 100 percent. Moreover, any numerical range defined by two R numbers as defined in the above is also specifically disclosed. The use of the term "about" means±10% of the subsequent number, unless otherwise stated. Use of the term "optionally" with respect to any element of a claim means that the element is required, or alternatively, the element is not required, both alternatives being within the scope of the claim. Use of broader terms such as comprises, includes, and having should be understood to provide support for narrower terms such as consisting of, consisting essentially of, and comprised substantially of. Accordingly, the scope of protection is not limited by the description set out above but is defined by the claims that follow, that scope including all equivalents of the subject matter of the claims. Each and every claim is incorporated as further disclosure into the specification and the claims are embodiment(s) of the present disclosure. The discussion of a reference in the disclosure is not an admission that it is prior art, especially any reference that has a publication date after the priority date of this application. The disclosure of all patents, patent applications, and publications cited in the disclosure are hereby incorporated by reference, to the extent that they provide exemplary, procedural, or other details supplementary to the disclosure.

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

What is claimed:

1. A method for establishing a label switched path (LSP) implemented by a network component, the method comprising:
   receiving a first path message from a network node outside of a topology-transparent zone (TTZ) along a path for the LSP;
   computing a TTZ path through the TTZ from the network component to an egress TTZ edge node along the LSP;
   sending a second path message to a TTZ internal node along the TTZ path;
   receiving a first reservation (RESV) message from the TTZ internal node that comprises a label allocated for the egress TTZ edge node; and
   sending a second RESV message that comprises a label allocated for the network component and the label allocated for the egress TTZ edge node to the network node, wherein sending the second RESV message comprises removing a label for the TTZ internal node along the TTZ path,
   wherein the LSP crosses a plurality of network domains and the TTZ,
   wherein the LSP is established by the network component within the TTZ,
   wherein the LSP includes at least one node outside the TTZ when initially established, and
   wherein network nodes external to the TTZ and interacting with the TTZ are unaware of an internal topology of the TTZ.

2. The method of claim 1, wherein the first path message and the second path message comprise routing information for the path and a label request.

3. The method of claim 1, wherein the TTZ comprises a plurality of TTZ internal nodes, and wherein network nodes outside of the TTZ are unaware of the plurality of TTZ internal nodes.

4. The method of claim 1, wherein the label for the TTZ internal node is not recorded in the second RESV message.

5. The method of claim 1, wherein the TTZ path comprises a plurality of TTZ internal nodes, and wherein network nodes outside of the TTZ are unaware of the TTZ path.

6. The method of claim 1, wherein the TTZ connects a first network and a second network of the plurality of networks.

7. The method of claim 1, wherein the network component is coupled to one or more network nodes outside of the TTZ, one or more TTZ internal nodes, and one or more TTZ edge nodes.

8. A computer program product comprising computer executable instructions stored on a non-transitory computer readable medium such that, when executed by a processor causes a network node to:
receive a first path message that comprises routing information for a path for a label switched path (LSP) from a topology-transparent zone (TTZ) node within the TTZ along the path;
record a virtual link to an ingress TTZ edge node along the path for the LSP in a second path message using the routing information, wherein the virtual link does not comprise routing information about the TTZ internal nodes and the virtual link is a link between a first TTZ edge node and the ingress TTZ edge node;
send the second path message to a network node outside of the TTZ along the path for the LSP, wherein the second path message path message comprises a reference to the virtual link;
receive a first reservation (RESV) message from the network node outside of the TTZ that comprises a routing label allocated by the network node outside of the TTZ; and
send a second RESV message to the TTZ node that comprises a routing label allocated for the ingress TTZ edge node,
wherein the path for the LSP crosses a plurality of networks and the TTZ,
wherein the LSP includes at least one node outside the TTZ when initially established, and
wherein network nodes external to the TTZ and interacting with the TTZ are unaware of a internal topology of the TTZ.

9. The computer program product of claim 8, wherein the TTZ comprises one or more TTZ internal nodes, and wherein the ingress TTZ edge node does not share routing information for the TTZ internal nodes with the network node outside of the TTZ.

10. The computer program product of claim 8, wherein the ingress TTZ edge node is coupled to one or more network nodes outside of the TTZ, one or more TTZ internal nodes, and one or more TTZ edge nodes.

11. The computer program product of claim 8, wherein the virtual link masks a TTZ path that comprises one or more TTZ internal nodes.

12. An apparatus comprising:
a receiver; and
a processor coupled to a memory and the receiver, wherein the memory comprises computer executable instructions stored in a non-transitory computer readable medium such that when executed by the processor causes the processor to:
send a first path message to a network node disposed outside a transparent-topology zone (TTZ) along a first path from a first network to a second network through the TTZ;
receive a first plurality of routing labels in response to sending the first path message;
send a second plurality of routing labels to a network node of the first network, wherein sending the second plurality of routing labels establishes a first label switched path (LSP);
send a second path message along a second path from the first network to an egress edge node of the TTZ;
receive a third plurality of routing labels in response to sending the second path message, wherein receiving the third plurality of routing labels establishes a second LSP including at least one node outside the TTZ when the second LSP is initially established, and wherein network nodes external to the TTZ and interacting with the TTZ are unaware of an internal topology of the TTZ;
send data traffic along the first LSP;
detect a fault is present along the first LSP; and
reroute data traffic from the first LSP to the second LSP when the fault along the first LSP is present, and
wherein the second plurality of routing labels include routing labels for a plurality of TTZ edge nodes while excluding any routing label for any internal node within the TTZ along the first LSP.

13. The apparatus of claim 12, wherein each of the path messages comprise routing information for an LSP and a label request.

14. The apparatus of claim 12, wherein the first path message comprises routing information for one or more network nodes in the first network, the plurality of TTZ edge nodes, and one or more network nodes in the second network.

15. The apparatus of claim 12, wherein the apparatus is unaware of routing information for one or more internal nodes that are within the TTZ and along the first LSP.

16. The apparatus of claim 15, wherein the apparatus is unaware of routing information for one or more internal nodes that are within the TTZ and along the second LSP.

17. The apparatus of claim 12, wherein the first LSP comprises a plurality of network nodes outside of the TTZ and the plurality of TTZ edge nodes.

18. The apparatus of claim 12, wherein detecting the fault is present along the first LSP comprises using a bidirectional fault detection (BFD) session.

19. The apparatus of claim 12, wherein rerouting data traffic from the first LSP to the second LSP comprises switching the data traffic from the first LSP to the second LSP.

* * * * *